(12) United States Patent
Moore et al.

(10) Patent No.: US 10,723,485 B2
(45) Date of Patent: Jul. 28, 2020

(54) APPARATUS THAT SUPPORTS AN AIRCRAFT FUSELAGE WITHOUT EXTERIOR SURFACE CONTACT

(71) Applicant: The Boeing Company, Chicago, IL (US)

(72) Inventors: Matthew B. Moore, Mukilteo, WA (US); Lile P. Squires, Spokane Valley, WA (US); Patrick B. Stone, Monroe, WA (US); Jeffrey A. Zornes, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 108 days.

(21) Appl. No.: 15/956,023

(22) Filed: Apr. 18, 2018

(65) Prior Publication Data

US 2019/0322387 A1    Oct. 24, 2019

(51) Int. Cl.
*B23Q 7/00* (2006.01)
*B64F 5/10* (2017.01)
(Continued)

(52) U.S. Cl.
CPC ............ *B64F 5/10* (2017.01); *B05B 13/0221* (2013.01); *B05B 13/0285* (2013.01); *B05D 1/02* (2013.01); *B64F 5/50* (2017.01)

(58) Field of Classification Search
CPC ......... B23P 11/00; B23P 19/00; B23P 19/006; B23P 19/02; B23P 19/10; B23P 2700/01; B64F 5/10; B64F 5/50; B25B 11/00
See application file for complete search history.

(56) References Cited

U.S. PATENT DOCUMENTS

| 4,239,196 A | * | 12/1980 | Hanger | ................ B25H 1/0007 |
| | | | | 269/17 |
| 5,220,849 A | | 6/1993 | Lande et al. | |

(Continued)

FOREIGN PATENT DOCUMENTS

| DE | 487996 | 12/1929 |
| DE | 102004056284 | 5/2006 |

(Continued)

OTHER PUBLICATIONS

European Search Report dated Sep. 17, 2019, issued in co-pending European Patent Application No. 19161878.4.

(Continued)

*Primary Examiner* — Lee D Wilson
(74) *Attorney, Agent, or Firm* — Joseph M. Rolnicki; Evans & Dixon, L.L.C.

(57) ABSTRACT

An airframe handling apparatus is operable to support and move a partially assembled aircraft fuselage. The aircraft fuselage is incomplete, lacking a wing and landing gear. The apparatus is attachable to the aircraft fuselage in place of the wing and landing gear, utilizing wing attachment structures on the aircraft fuselage that are designed for flight loads. With the aircraft fuselage attached to the apparatus, the entire fuselage is supported on the apparatus that can be operated to move and manipulate the aircraft fuselage as if the wing and landing gear were present. With the apparatus attached to the aircraft fuselage, movement of the fuselage by the apparatus imparts no handling-induced internal loads on the aircraft fuselage, and maximizes unobstructed access to the exterior surface of the fuselage for painting and other surface preparations.

20 Claims, 15 Drawing Sheets

(51) Int. Cl.
*B64F 5/50* (2017.01)
*B05B 13/02* (2006.01)
*B05D 1/02* (2006.01)

(56) References Cited

U.S. PATENT DOCUMENTS

| | | | |
|---|---|---|---|
| 6,095,746 A * | 8/2000 | Bergin | B62B 5/0083 |
| | | | 269/17 |
| 6,170,141 B1 * | 1/2001 | Rossway | F01D 25/285 |
| | | | 206/319 |
| 8,567,761 B2 * | 10/2013 | De Jong | B66F 3/46 |
| | | | 254/134 |
| 9,273,990 B1 | 3/2016 | Buchheit | |
| 10,029,270 B2 * | 7/2018 | Noel | B05B 13/0285 |
| 2012/0110816 A1 * | 5/2012 | Groves | B62B 3/10 |
| | | | 29/428 |
| 2013/0071573 A1 | 3/2013 | Brewer | |
| 2016/0069477 A1 * | 3/2016 | Tabor | F16L 1/06 |
| | | | 29/559 |
| 2018/0118540 A1 * | 5/2018 | Stone | B66F 7/16 |
| 2019/0322387 A1 * | 10/2019 | Moore | B64F 5/10 |

FOREIGN PATENT DOCUMENTS

| | | |
|---|---|---|
| DE | 102004056284 A1 | 5/2006 |
| EP | 0341134 | 11/1989 |
| EP | 2604523 | 6/2013 |
| EP | 2604523 A2 | 6/2013 |
| EP | 2604523 A3 | 5/2015 |
| EP | 2979810 A1 | 2/2016 |
| EP | 3290166 | 3/2018 |
| EP | 3292914 A1 | 3/2018 |
| FR | 603540 | 4/1926 |
| GB | 572377 | 10/1945 |

OTHER PUBLICATIONS

European Search Report dated Sep. 17, 2019, issued in co-pending European Patent Application No. 19161875.0.
Co-pending, related Application No. 15956071, filed Apr. 18, 2018.
Extended European Search Report dated Jan. 24, 2020 from co-pending EPO Application No. 19168784.

* cited by examiner

APPARATUS THAT SUPPORTS AN AIRCRAFT FUSELAGE WITHOUT EXTERIOR SURFACE CONTACT

FIELD

This disclosure pertains to an airframe handling apparatus that supports and moves an aircraft fuselage. Components of the apparatus are attachable to the aircraft fuselage utilizing wing attachment structures on the aircraft fuselage that are designed for flight loads. With the aircraft fuselage attached to the apparatus, the entire fuselage is supported on two transport mechanisms of the apparatus that can be operated to move and manipulate the aircraft fuselage, supporting the aircraft fuselage as if the wing was present. With the apparatus attached to the aircraft fuselage, movement of the fuselage by the apparatus imparts no handling-induced internal loads on the aircraft fuselage, and maximizes unobstructed access to the exterior surface of the fuselage for painting and other surface preparations. Other components are utilized in fuselage assembly, for example, supporting individual fuselage components as those components are positioned with respect to and attached to one another.

BACKGROUND

In the typical assembly of an aircraft, the wing, forward landing gear, and the landing gear beneath the wing are attached to the fuselage relatively early in the assembly process. This enables the aircraft to be moved on the aircraft landing gear during the assembly process.

When the assembly of the aircraft advances to the stage where the exterior of the aircraft fuselage is to be painted, the aircraft is moved into a paint hanger. The paint hanger has a large footprint to accommodate the aircraft and in particular the aircraft wing, with the aircraft wing and the landing gear beneath the aircraft wing being needed to move the aircraft through the assembly process.

Alternatives to maintaining large paint hangers for aircraft have been considered. The alternatives involve painting the aircraft fuselage prior to the aircraft wing and landing gear beneath the wing being assembled to the aircraft fuselage. This enables the fuselage to be painted in a much smaller paint hanger than is required for painting an aircraft with the wing and landing gear beneath the wing assembled to the aircraft.

For example, an overhead crane that suspends the aircraft fuselage has been proposed. However, a suspension system such as this does not allow for movement of the aircraft fuselage beyond the reach of the suspension system.

In another example, the use of automated guide vehicles (AGV) to support and move the aircraft fuselage has been proposed. However, these proposed systems tend to obstruct surface areas of the aircraft fuselage where they engage and support the aircraft fuselage, preventing paint from reaching these areas.

SUMMARY

The airframe handling apparatus of this disclosure overcomes the disadvantages associated with applying paint or other surface preparations to an aircraft fuselage prior to wing and landing gear installation. The apparatus operates to support and move the aircraft fuselage. In particular, the apparatus attaches to the aircraft fuselage in place of the wing, utilizing wing attachment structures on the underside of the aircraft fuselage that are designed for flight loads. With the apparatus temporarily, removably attached to the aircraft fuselage, the aircraft fuselage can be supported on two fuselage transport mechanisms. The two transport mechanisms allow the aircraft fuselage to be moved and manipulated as if the landing gear were present. Because the apparatus is attached to the aircraft fuselage at wing attachment structures that are designed for flight loads, the apparatus imparts no handling-induced internal loads on the incomplete aircraft fuselage structure, and maximizes unobstructed access to all exterior areas of the aircraft fuselage skin for painting and/or other surface preparation.

The apparatus includes an assembly jig or jig that is removably attachable to an underside of an aircraft fuselage. The jig has a plurality of locators that are each positioned on the jig to align with or coincide with wing attachment structures on the underside of the aircraft fuselage. The locators are attached to the wing attachment structures of the aircraft fuselage and secure the jig in an opening in the underside of the aircraft fuselage provided for the wing box, thereby attaching the jig to the aircraft fuselage in place of the wing and removing the need for the landing gear beneath the wing during certain stages of aircraft fabrication.

The aircraft fuselage includes a center section of the aircraft fuselage that is attachable between one or more forward sections of the aircraft fuselage and one or more rearward sections of the aircraft fuselage.

The apparatus also includes a jig transportation mechanism. The jig transportation mechanism is configured to support the jig on the jig transportation mechanism. The jig transportation mechanism enables the jig and the center section of the aircraft fuselage attached to the jig to be moved to an assembly hanger or area where a forward section of the aircraft fuselage can be attached to the center section of the aircraft fuselage, and a rearward section of the aircraft fuselage can be attached to the center section of the aircraft fuselage. Additionally, the jig transportation mechanism enables movement of a completed aircraft fuselage The apparatus also includes a pair of fuselage transport mechanisms. Each fuselage transport mechanism has a base that supports the fuselage transport mechanism. The base is operable to move the fuselage transport mechanism horizontally, in any direction over a hanger or assembly facility floor.

The fuselage transport mechanism also includes a plurality of upright bodies or jack towers that extend upwardly from the base. Each jack tower has a jack tine that projects horizontally from the jack tower. The jack tower is operable to move the jack tine upwardly and downwardly along the jack tower.

After the jig transport mechanism has moved the jig and the fuselage center section attached to the jig to the assembly area, and after the fuselage forward section and fuselage rearward section have been assembled to the center section, the fuselage transport mechanisms can be moved to opposite sides of the jig. The fuselage transport mechanisms are then moved toward the jig, causing the tines of the towers to extend into the jig. This removably attaches the jig, the center fuselage section on the jig and the forward fuselage section and the rearward fuselage section connected to the center fuselage section to the pair of fuselage transport mechanisms. The tines of the fuselage transport mechanisms can be raised, raising the jig and the assembled aircraft fuselage off of the jig transport mechanism. The jig transport mechanism can then be moved from beneath the aircraft fuselage. With the pair of fuselage transfer mechanisms supporting the jig and the aircraft fuselage assembled on the jig, the exterior surface or exterior skin of the aircraft fuselage is entirely accessible for painting or other surface preparations.

The features, functions and advantages that have been discussed can be achieved independently in various embodiments or may be combined in yet other embodiments, further details of which can be seen with reference to the following description and drawings.

DESCRIPTION

The airframe handling apparatus of this disclosure is basically comprised of four components, an assembly jig or jig 12, a jig transport mechanism 14, and a pair of fuselage transport mechanisms 16, 18. Each of these components is constructed of materials that provide the components with sufficient structural strength for their intended functions.

Figure 1:
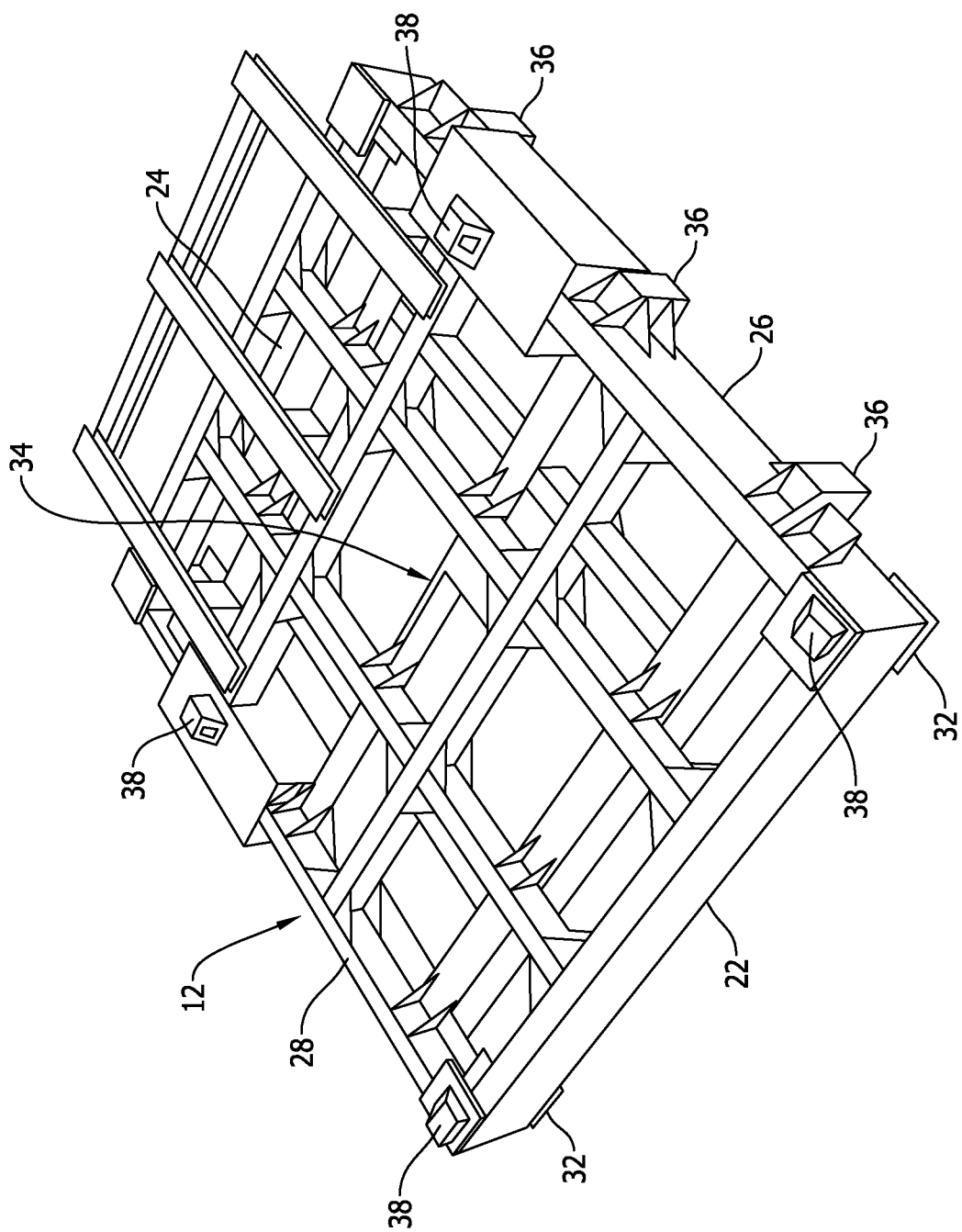
FIG. 1 is a representation of a top, perspective view of the assembly jig or jig of the apparatus of this disclosure.

FIG. 1 is a representation of a top, perspective view of the jig assembly or jig 12. The jig 12 has a general rectangular configuration defined by a front panel 22, an opposite rear panel 24, a right side panel 26 and an opposite left side panel 28. The jig 12 is supported on four support columns 32 positioned at the four corners of the jig 12. Only two of the support columns 32 are visible in FIG. 1. A reinforcing framework 34 interconnects the front panel 22 and rear panel 24, and the right side panel 26 and the left side panel 28. The reinforcing framework 34 adds structural rigidity to the construction of the jig 12. There are three reinforced receivers 36 spatially arranged along the right side panel 26 and the left side panel 28. Only the receivers 36 on the right side panel 26 are represented in FIG. 1. The positions and the constructions of the receivers 36 on the left side panel 28 are the same as those of the receivers 36 on the right side panel 26. The receivers 36 have a general tubular construction with a rectangular cross-section configuration. The receivers 36 are constructed and configured to interface with the fuselage transport mechanisms 16, 18, as will be explained. The jig 12 also has a plurality of locators 38 on the top of the jig. Each locator 38 is a wing attachment structure. There are four locators 38 represented in FIG. 1. The locators 38 are an important part of the construction of the jig 12. The locators 38 are positioned on the jig 12 relative to each other to align with or coincide with wing attachment structures on the underside of an aircraft fuselage, as will be explained. Although there are four locators 38 arranged in a rectangular pattern adjacent the four corners of the jig 12 represented in FIG. 1, the number of locators and their relative positions on the jig will be different depending on the construction of the aircraft fuselage with which the airframe handling apparatus is used.

Figure 2:
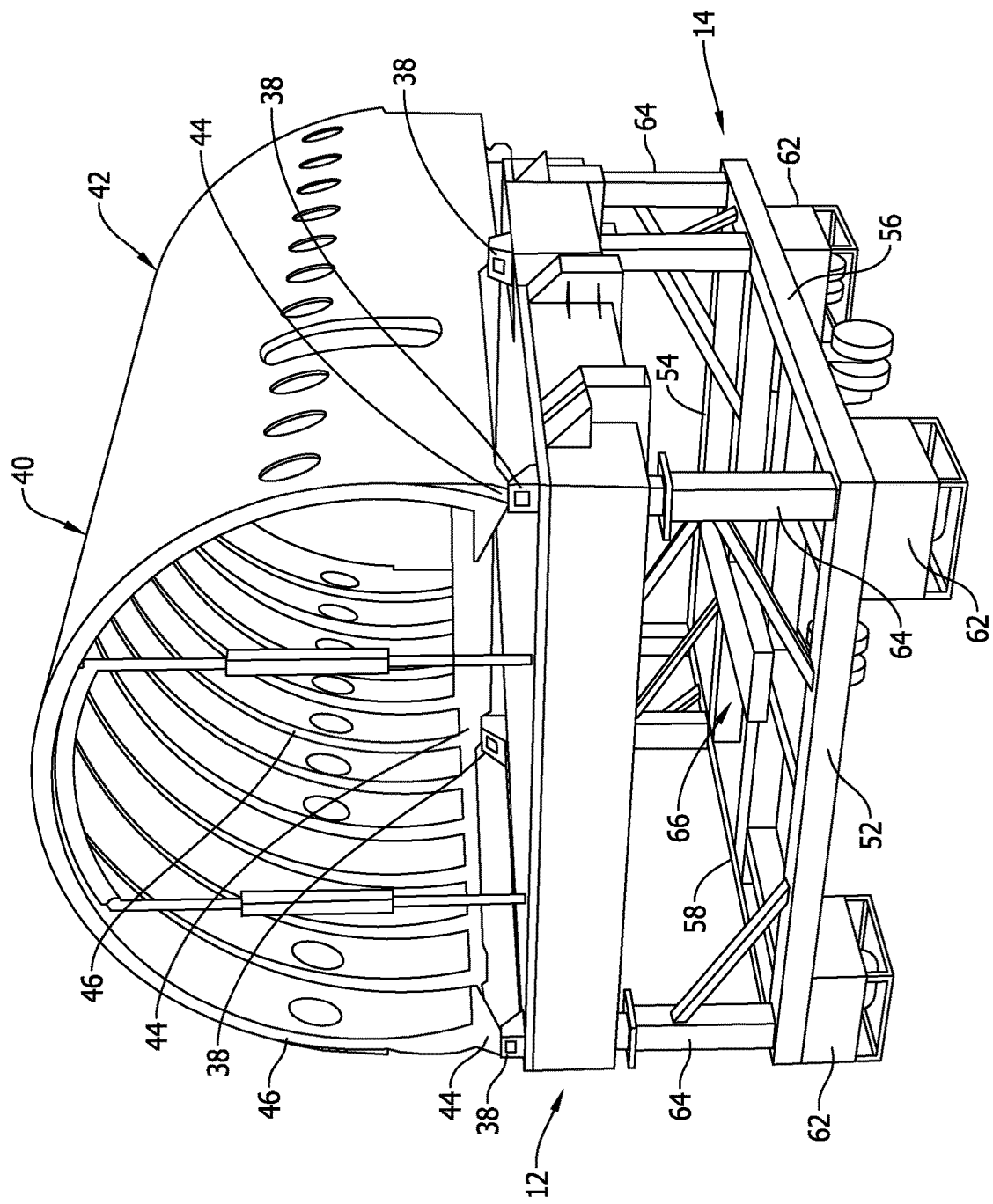
FIG. 2 is a representation of a perspective view of the jig with a center section of an aircraft fuselage attached to the jig and with the jig supported on the jig transport mechanism of the apparatus of this disclosure.

FIG. 2 is a representation of the jig 12 removably attached to center section 40 of an aircraft fuselage 42. At this point in time, the aircraft fuselage 42 is a partially assembled aircraft fuselage (i.e., center section 40) that has been assembled on the jig 12. The center section 40 of the aircraft fuselage 42 is attachable between one or more forward sections of the aircraft fuselage 42 and one or more rearward sections of the aircraft fuselage 42, as will be explained. As stated earlier, the plurality of locators 38 are positioned on the jig 12 to align with or coincide with wing attachment structures 44 on the underside of the center section 40 of the aircraft fuselage 42. The locators 38 are positioned on the jig 12 to correspond with positions of the wing attachment structures 44 in an opening in the underside of the center section 40 of the aircraft fuselage 42 provided for a wing box of an aircraft wing. The locators 38 are attached to the wing attachment structures 44 of the aircraft fuselage 42 and secure the jig 12 in the opening in the underside of the aircraft fuselage 42 provided for the wingbox, thereby attaching the jig 12 to the aircraft fuselage 42 in place of the wing and in place of the landing gear beneath the wing. As represented in FIG. 2, each of the locators 38 is attached to a wing attachment structure 44 at the opposite bottom ends of two epsilons or ribs 46 of the fuselage 42 that will attach to the aircraft wing when the wing is assembled to the fuselage 42. Securing the portion of the aircraft fuselage 42 to each locator 38 accurately positions center section 40 of the aircraft fuselage 42 relative to the jig 12. The positions of the locators 38 accurately position the wing attachment structures 44 at the bottom ends of the two ribs 46. With the two ribs 46 having the wing attachment structures 44 secured to the locators 38 on the jig 12, the remainder of the aircraft fuselage 42 is then assembled on the two ribs 46 and the jig 12. This constructs the aircraft fuselage 42, or more specifically the center section 40 of the aircraft fuselage 42, with the wing attachment structures 44 accurately positioned so that an aircraft wing can be assembled to the aircraft fuselage 42 in place of the jig 12 when the construction of the aircraft fuselage 42 is complete.

FIG. 2 is also a representation of the jig 12 supported on the jig transport mechanism 14. The jig transport mechanism 14 has a general, rectangular configuration that closely corresponds to the rectangular configuration of the jig 12. The jig transport mechanism has a base constructed with a front bar 52 and an opposite rear bar 54, and a right bar 56 and an opposite left bar 58. The four bars 52, 54, 56, 58 give the jig transport mechanism 14 its rectangular configuration that closely conforms to the rectangular configuration of the jig 12. The jig transport mechanism 14 also has four drive wheel assemblies 62 positioned at the four corners of the jig transport mechanism 14. The drive wheel assemblies 62 can be controlled to move the jig transport mechanism 14 in any direction over the floor of a hanger or a manufacturing facility. There are also four support pillars 64 that extend upwardly from the four corners of the jig transport mechanism 14. The support pillars 64 are positioned to engage with and support the four support columns 32 of the jig 12, and thereby support the jig 12 on the jig transport mechanism 14. The support columns 32 of the jig 12 engage with and are supported on the tops of the support pillars 64 of the jig transport mechanism 14 without the support columns 32 being attached to the support pillar 64. In this manner, the jig 12 can be lifted off of the jig transport mechanism 14 supporting the jig 12. The construction of the jig transport mechanism 14 is also reinforced by a reinforcing frame 66 that connects the front bar 52 and rear bar 54, and the right side bar 56 and left side bar 58.

Figure 6:
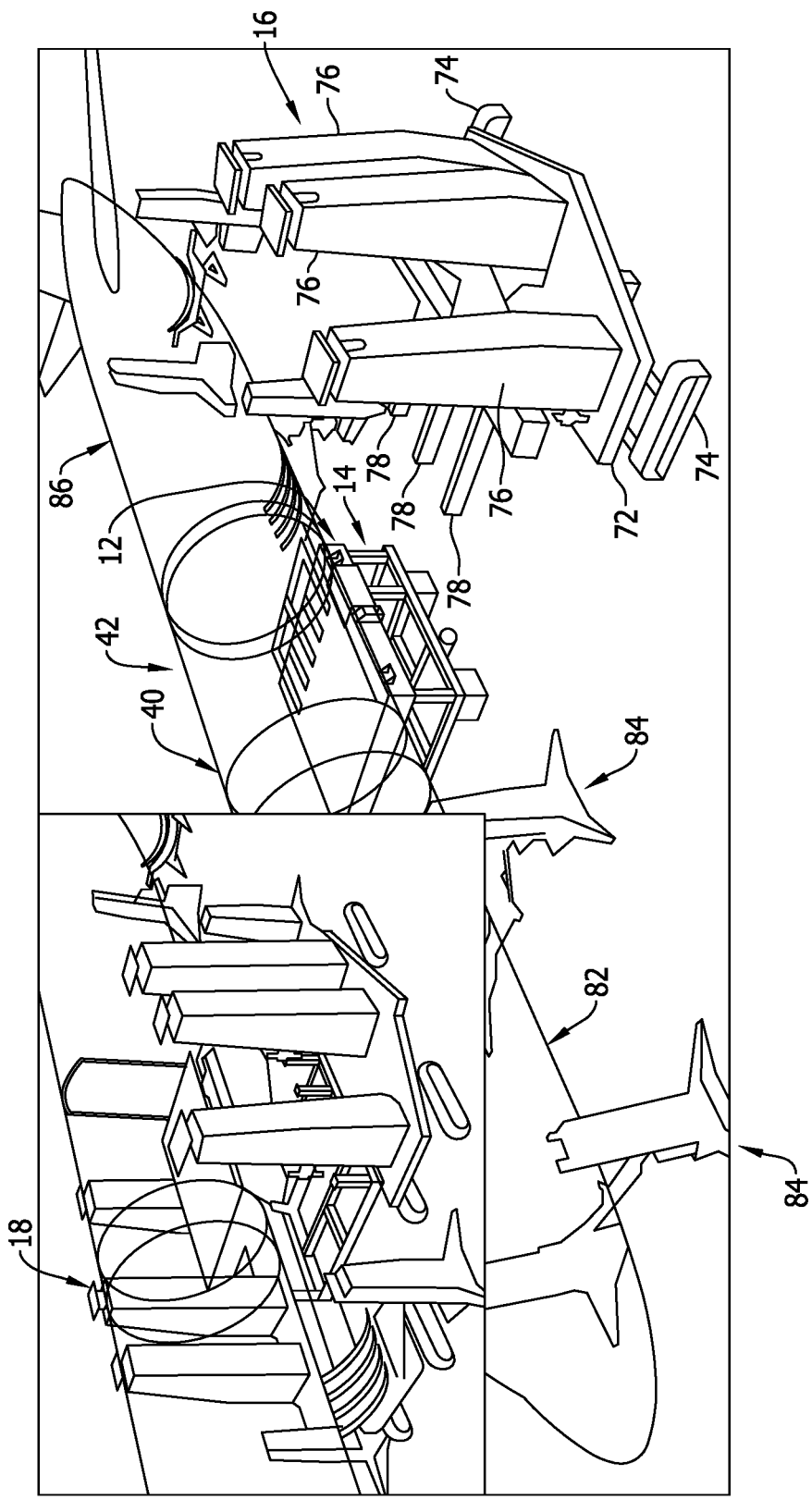
FIG. 6 is a representation of the pair of fuselage transport mechanisms of the apparatus of this disclosure where tines of the fuselage transport mechanisms are positioned to be inserted into opposite sides of the jig.

FIG. 6 shows a representation of the pair of fuselage transport mechanisms 16, 18. Only one of the fuselage transport mechanisms 16 is clearly shown in FIG. 6. However, both fuselage transport mechanisms 16, 18 have the same constructions. The fuselage transport mechanism 16 has a base 72 that supports the transport mechanism 16 for movement in substantially any desired direction. The base 72 is supported on two tracked automated guide vehicles 74. The automated guide vehicles 74 can be controlled to move the base 72 and the fuselage transport mechanism 16 in any desired direction. The fuselage transport mechanism 16 also has three upright bodies or jack towers 76 on the base 72. The three jack towers 76 are substantially the same in construction and are positioned side by side on the base 72. Each of the jack towers 76 has a fork tine 78 that projects horizontally from the jack tower. The three fork tines 78 are parallel and are positioned horizontally from each other by a distance that corresponds to the distance between the three reinforced receivers 36 in the opposite sides of the jig 12. This enables the three fork tines 78 to be inserted through the three reinforced receivers 36 in the opposite sides of the jig 12. The jack towers 76 are operable to selectively move their associated tine 78 vertically upwardly and downwardly.

In use of the airframe handling apparatus, an aircraft fuselage 42, or more specifically a center section 40 of the aircraft fuselage 42, is first assembled on the jig 12. This is done in an assembly area where the jig 12 is not yet positioned on the jig transport mechanism 14. The aircraft fuselage 42 is assembled on the jig 12 with wing attachment structures 44 of the aircraft fuselage 42 connected to the locators 38. The wing attachment structures 44 are accurately located on the locators 38 by pins or bolts that are inserted through the wing attachment structures 44 and the locators 38. This enables the aircraft fuselage 42 to be accurately constructed on the jig 12 where the wing attachment structures 44 will align with and coincide with structures on an aircraft wing that connect to the wing attachment structures 44 in attaching the wing to a completed aircraft fuselage.

Figure 3:
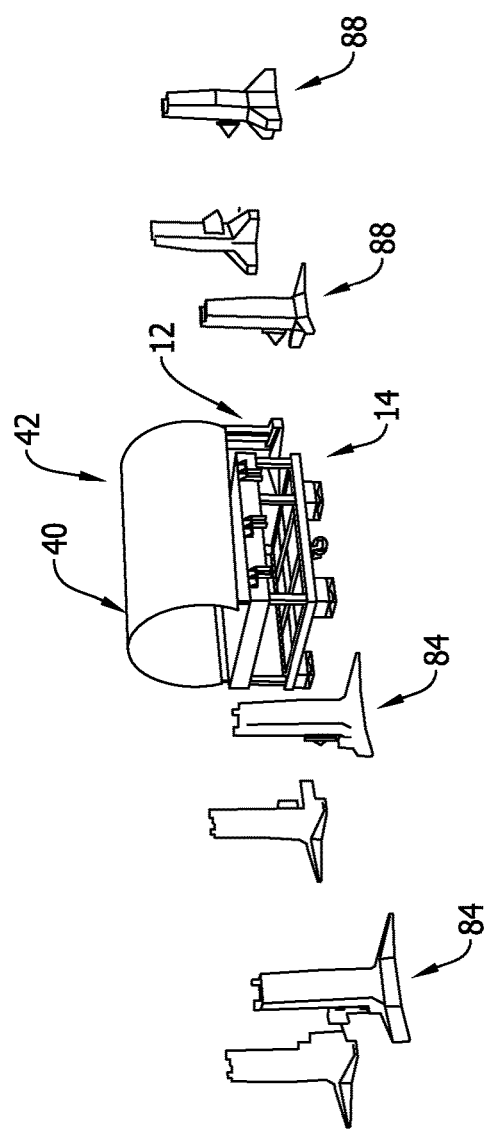
FIG. 3 is a representation of the center section of the aircraft fuselage attached to the jig which in turn is supported on the jig transport mechanism in an assembly area of a hanger or other aircraft manufacturing facility.

After the center section 40 of the aircraft fuselage 42 has been constructed on the jig 12, the jig is moved from the assembly area and is positioned on the jig transport mechanism 14 as represented in FIG. 2. The lifting of the jig 12 onto the jig transport mechanism 14 is accomplished by a crane or other equivalent mechanism. With the jig 12 removably attached to the aircraft fuselage 42 and positioned on the jig transport mechanism 14, the jig transport mechanism can then be operated to move the jig to a location where the remainder of the aircraft fuselage construction can be attached to the center section 40 of the aircraft fuselage 42. The fuselage transport mechanisms 16, 18 are operable to move the jig 12 horizontally in multiple directions, and to selectively raise and lower the jig 12 vertically. The movement of the jig 12 supporting the center section 40 of the aircraft fuselage 42 and supported on the jig transport mechanism 14 to the assembly area is represented in FIG. 3. The movement of the jig 12 and the center section 40 of the aircraft fuselage 42 to the assembly area by the jig transport mechanism 14 is controlled by a computer numerical control (CNC) system. This accurately positions the jig 12 removably attached to the center section 40 of the aircraft fuselage 42 and supported on the jig transport mechanism 14 in the assembly area. The jig 12 and the jig transport mechanism 14 are constructed to support the center section 40 of the aircraft fuselage 42 at an accurate vertical height position to enable the center section 40 of the aircraft fuselage 42 to be joined to one or more aircraft fuselage forward sections and one or more aircraft fuselage rearward sections.

Figure 4:
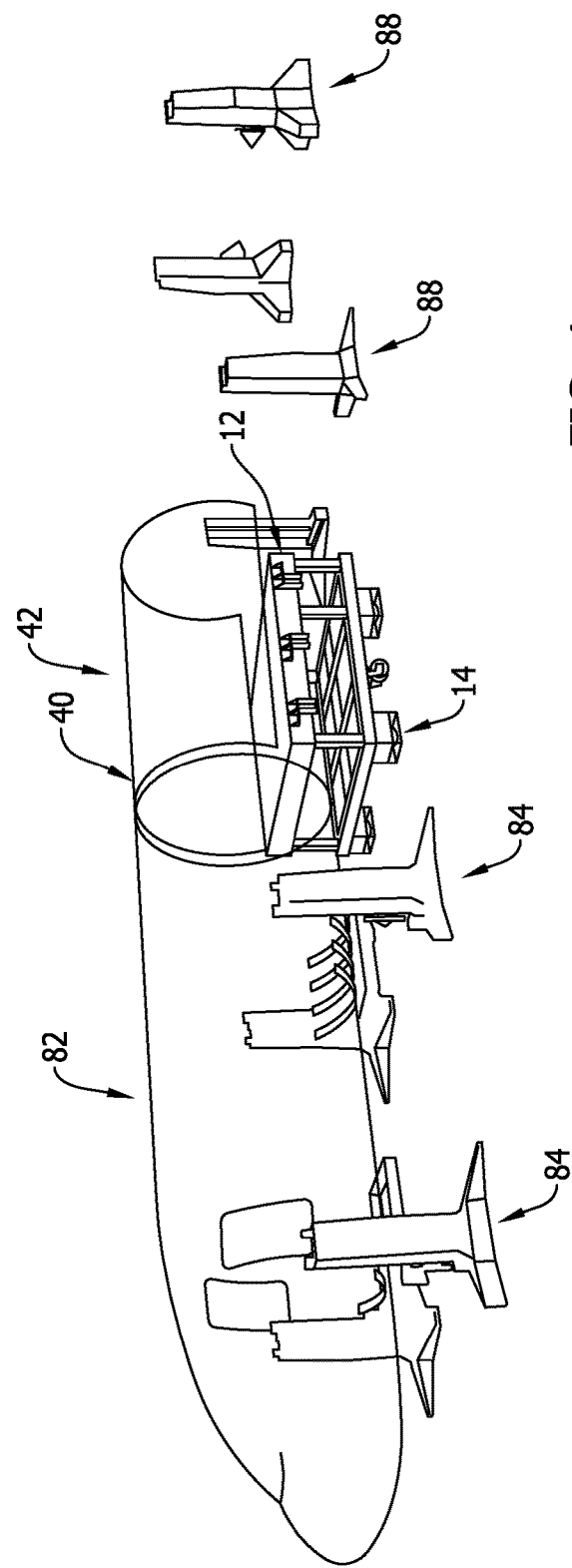
FIG. 4 is a representation of the center section of the aircraft fuselage, the jig, the jig transport mechanism and a forward section of an aircraft fuselage that is positioned relative to the center section of the aircraft fuselage for attachment to the center section of the aircraft fuselage.

FIG. 4 is a representation of an aircraft fuselage forward section 82 being attached to the center section 40 of the aircraft fuselage 42. In FIG. 4 the aircraft fuselage forward section 82 is supported on a conventional rigid body motion system 84. The rigid body motion system 84 is controlled by a CNC system to support the aircraft fuselage forward section 82 at the proper vertical height position relative to the center section 40 of the aircraft fuselage 42, and then move the aircraft fuselage forward section 82 to the center section 40 of the aircraft fuselage 42 for assembly of the aircraft fuselage forward section 82 to the center section 40 of the aircraft fuselage 42. The connection between the center section 40 of the aircraft fuselage 42 and the aircraft fuselage forward section 82 can be accomplished in any known manner.

Figure 5:
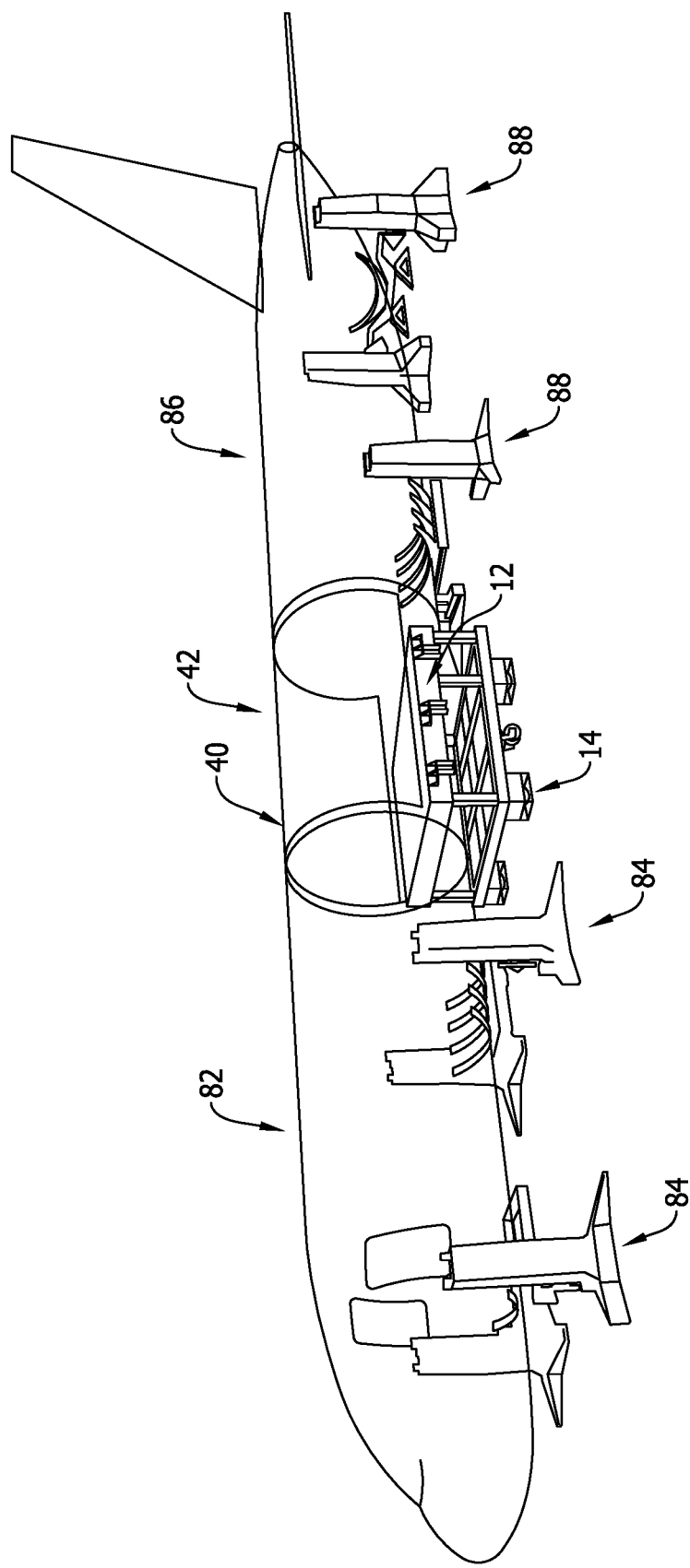
FIG. 5 is a representation of the center section of the aircraft fuselage, the jig, the jig transport mechanism, the forward section of the aircraft fuselage and a rearward section of the aircraft fuselage that is positioned relative to the center section of the aircraft fuselage for attachment to the center section of the aircraft fuselage.

FIG. 5 is a representation of an aircraft fuselage rearward section 86 being attached to the center section 40 of the aircraft fuselage 42. The aircraft fuselage rearward section 86 is also supported on a conventional rigid body motion system 88. The rigid body motion system 88 is controlled by a CNC system to elevate the aircraft fuselage rearward section 86 to a proper vertical height relative to the center section 40 of the aircraft fuselage 42 to attach the aircraft fuselage rearward section 86 to the center section 40 of the aircraft fuselage 42, and then move the aircraft fuselage rearward section 86 to the center section 40 of the aircraft fuselage 42 to where the aircraft fuselage rearward section 86 can be joined to the center section 40 of the aircraft fuselage 42. Again, the attachment of the aircraft fuselage rearward section 86 to the center section 40 of the aircraft fuselage 42 can be accomplished in any known conventional manner.

After the jig transport mechanism 14 has moved the jig 12 and the center section 40 of the aircraft fuselage 42 attached to the jig to the assembly area, and after the aircraft fuselage forward section 82 and the aircraft fuselage rearward section 86 have been assembled to the center section 40 of the aircraft fuselage 42, the pair of fuselage transport mechanisms 16, 18 are moved and positioned at the opposite sides of the jig 12. This is represented in FIG. 6. The fuselage transport mechanisms 16, 18 are then moved toward the jig 12, causing the fork tines 78 on the jack tower 76 of the fuselage transport mechanisms 16, 18 to move into and through the three reinforced receivers 36 on the opposite sides of the jig 12. This releasably attaches the pair of fuselage transport mechanisms 16, 18 to the jig 12, the center section 40 of the aircraft fuselage 42, the aircraft fuselage forward section 82 and the aircraft fuselage rearward section 86.

Figure 7:
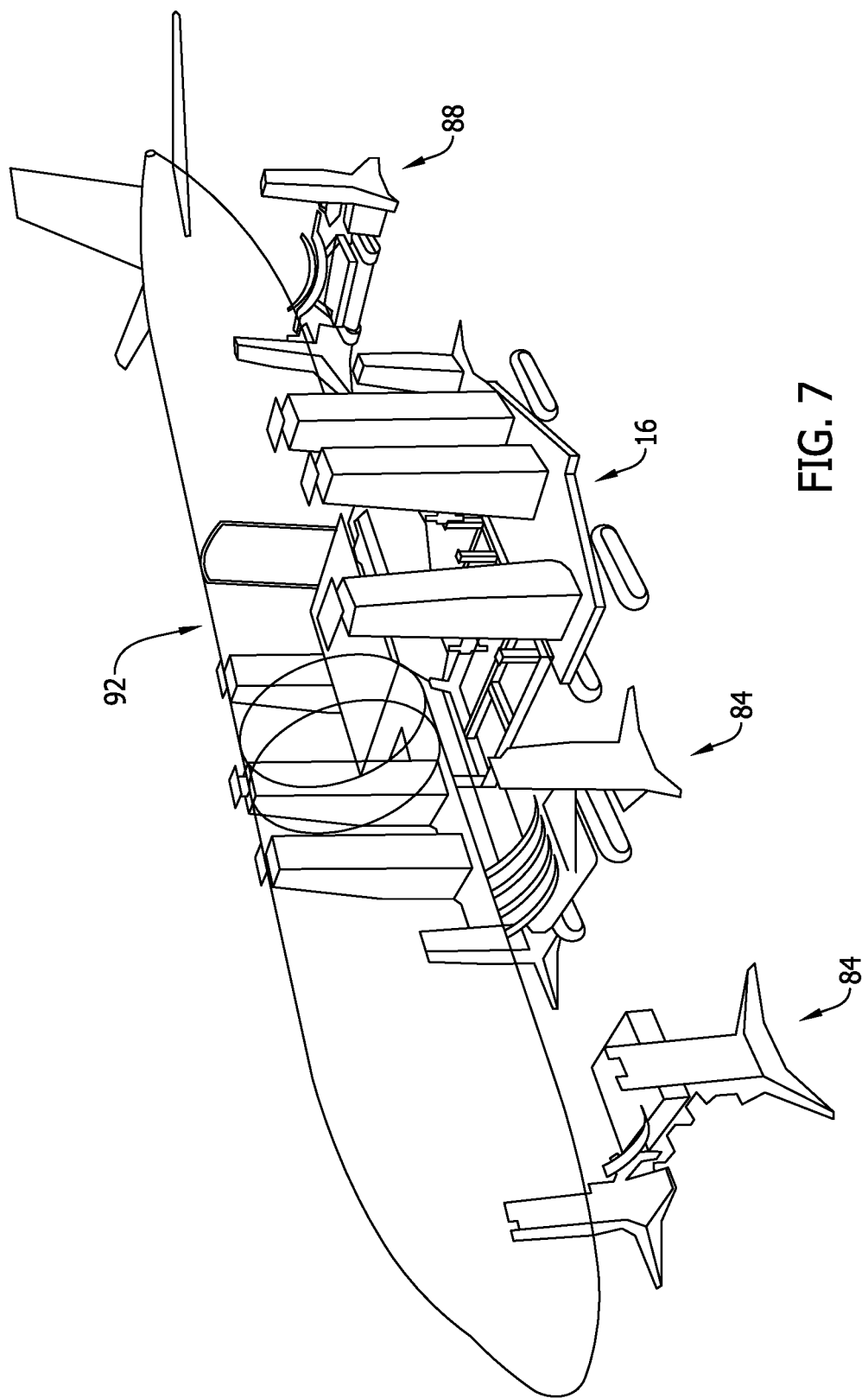
FIG. 7 is a representation of the pair of fuselage transport mechanisms with their tines inserted into the opposites sides of the jig and the tines lifting the jig and the aircraft fuselage attached to the jig.
Figure 8:
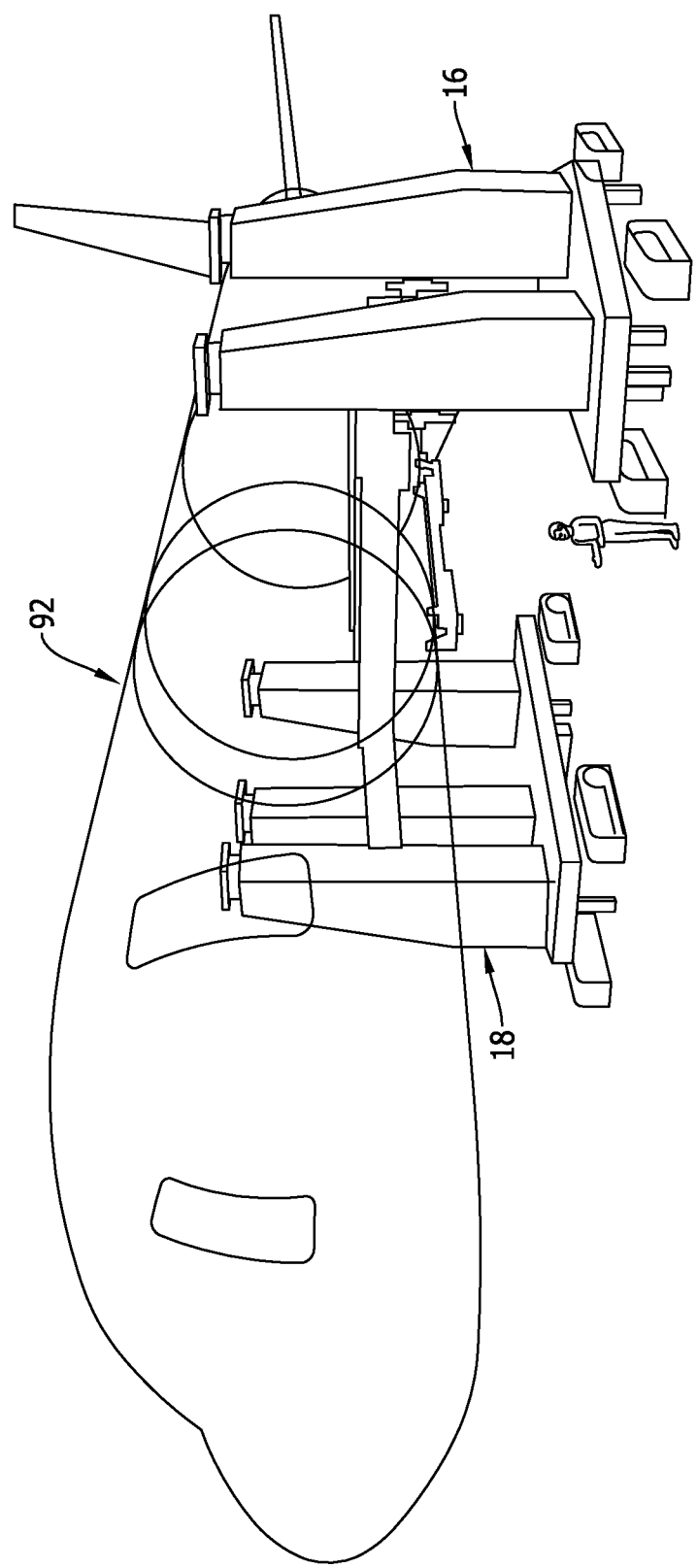
FIG. 8 is a representation of the aircraft fuselage and the attached jig lifted by the fuselage transport mechanisms.
Figure 9A:
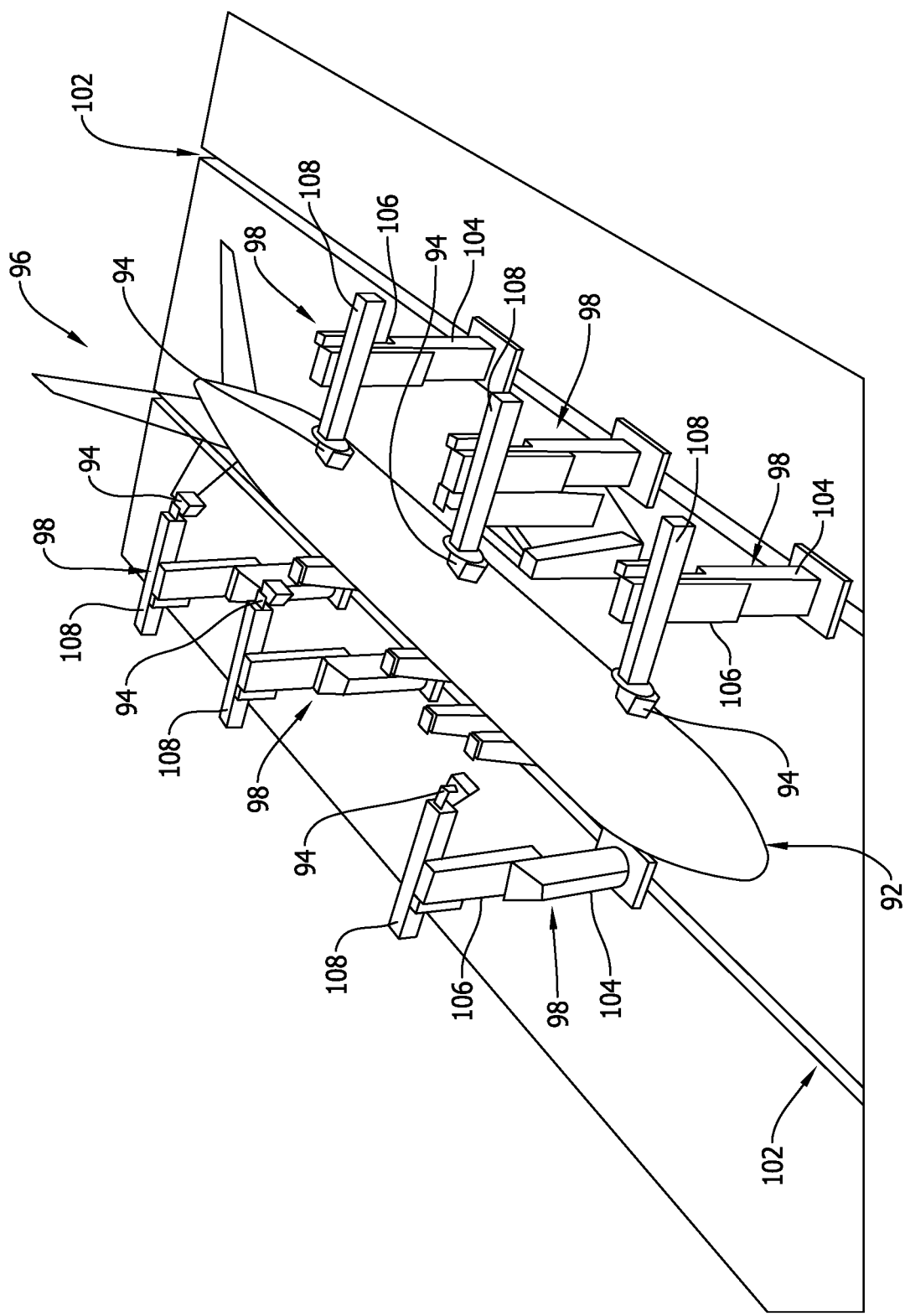
FIGS. 9A and 10 are representations of the aircraft fuselage attached to the jig and raised by the fuselage transport mechanisms in a paint hanger where the unobstructed exterior surfaces of the aircraft fuselage can be painted and/or receive other surface preparations.
Figure 10:
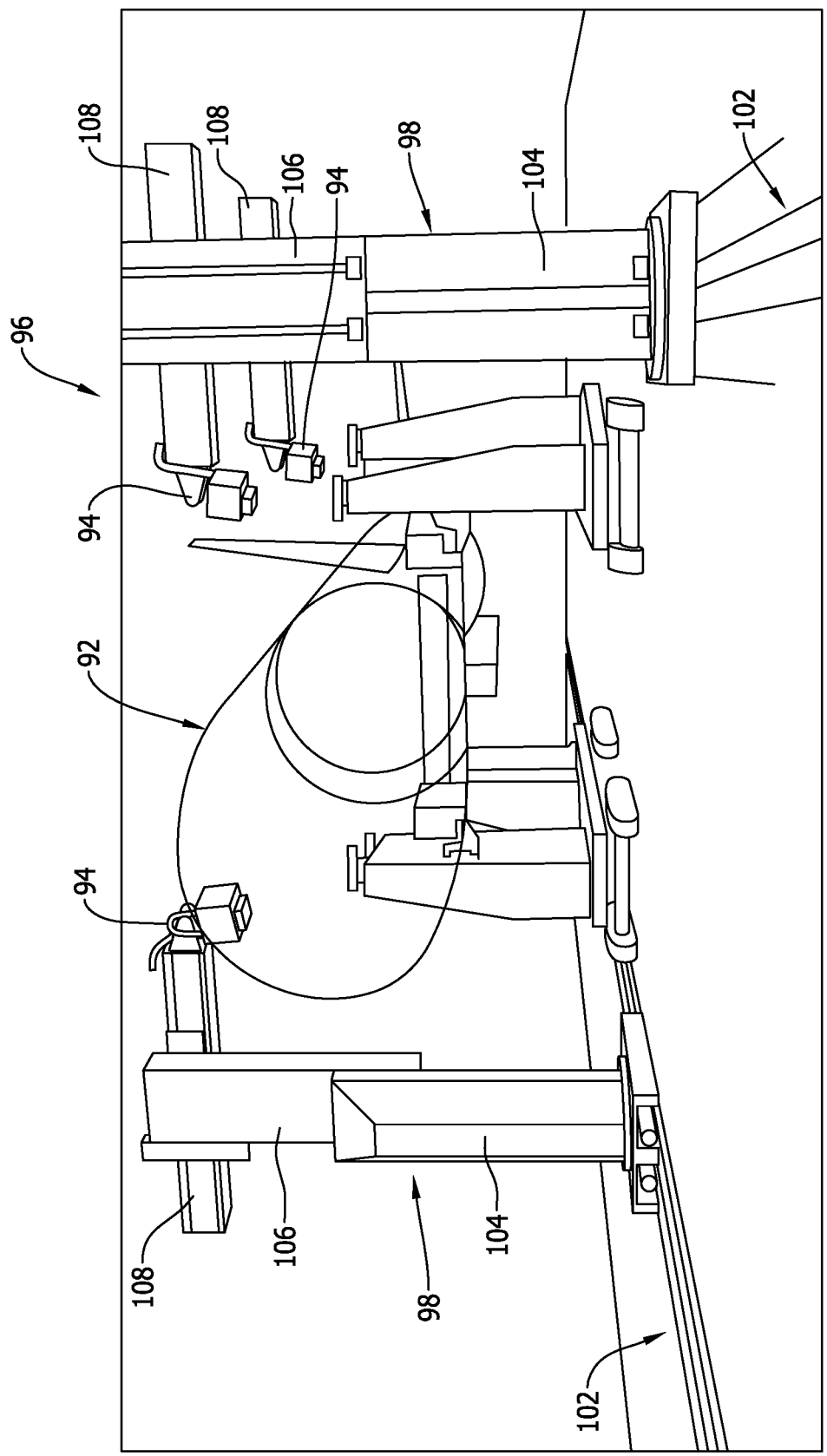
Figure 11:
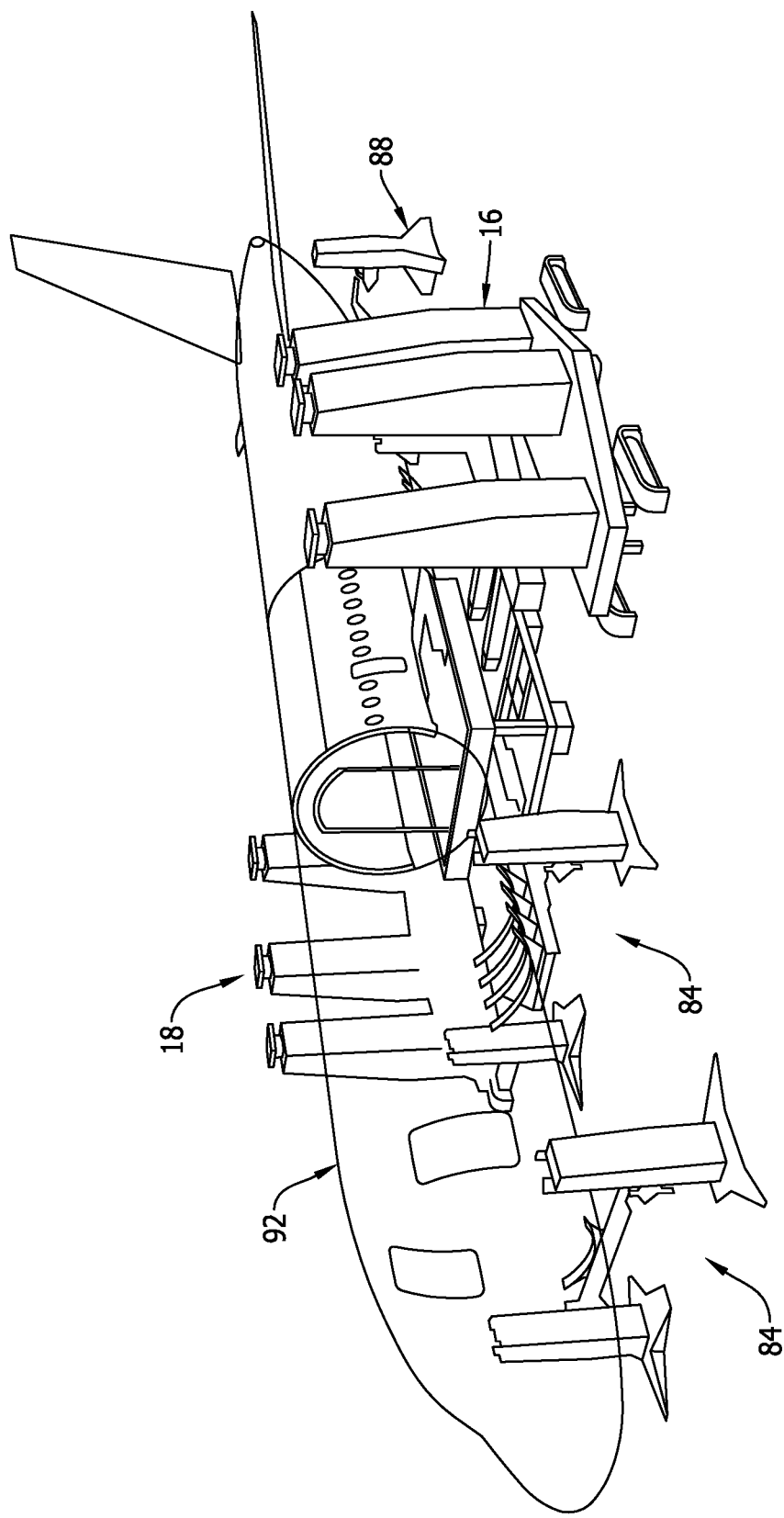
FIG. 11 is a representation of the aircraft fuselage being transported by the fuselage transport mechanisms back to an assembly hanger where the fuselage transport mechanisms lower the jig back onto the jig transport mechanism and lower the aircraft fuselage onto supporting cradles.
Figure 12:
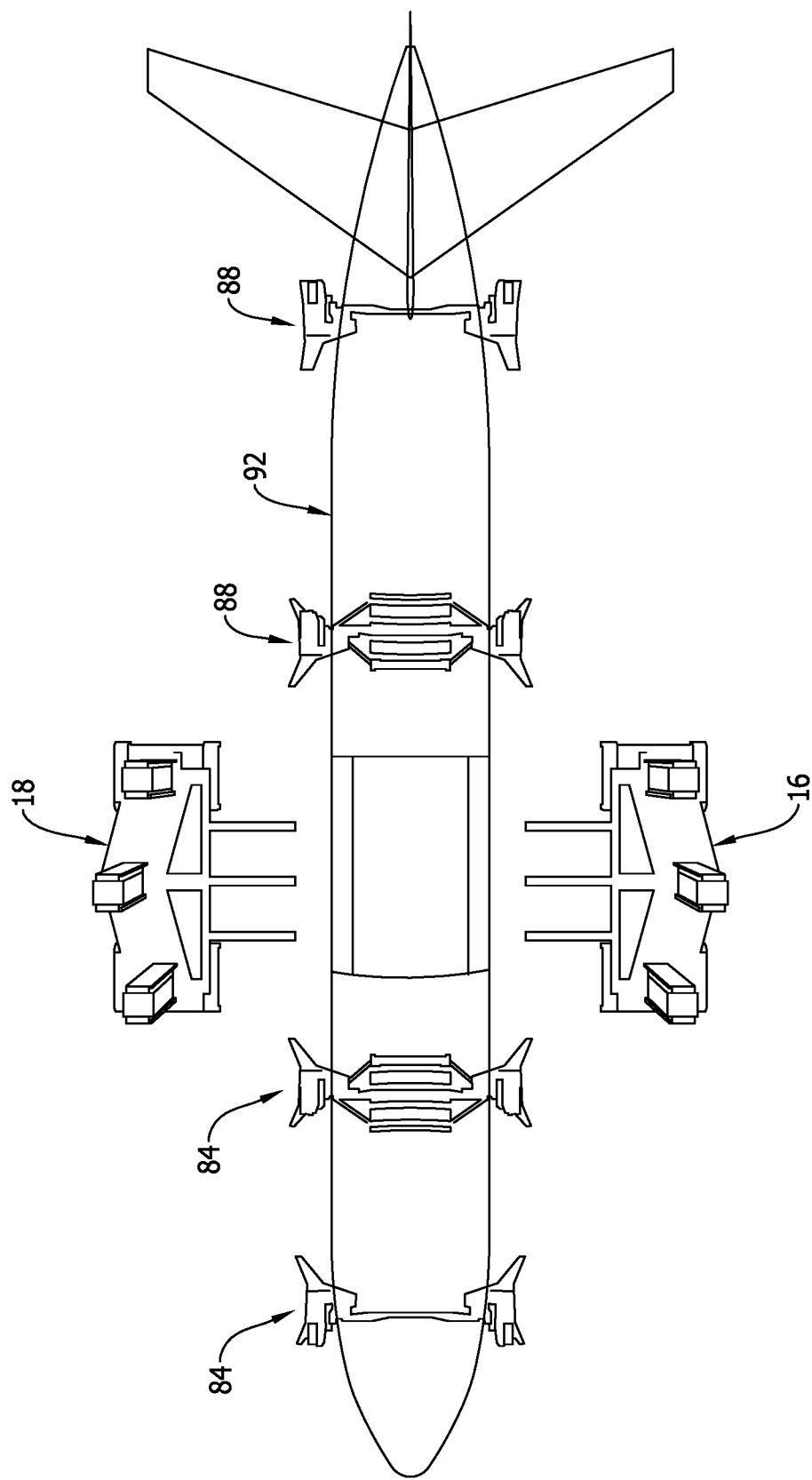
FIG. 12 is a representation of the fuselage transport mechanisms disengaged from the jig supported on the jig transport mechanism.

With the fuselage transport mechanisms 16, 18 removably attached to the jig 12 and assembled aircraft fuselage 92 comprised of the center section 40 of the aircraft fuselage 42, the aircraft fuselage forward section 82 and the aircraft fuselage rearward section 86 supported on the jig 12, the fuselage transport mechanisms 16, 18 support the entire assembled aircraft fuselage 92. The fuselage transport mechanisms 16, 18 can then lift the jig 12 and the assembled aircraft fuselage 92 off of and above the jig transport mechanism 14 and off of and above the rigid body motion systems 84, 88. This is represented in FIG. 7. With the entire assembled aircraft fuselage 92 raised above the jig transport mechanism 14 and the rigid body motion systems 84, 88, the jig transport mechanism 14 and the rigid body motion systems 84, 88 can be moved away from the assembled aircraft fuselage 92. This is represented in FIG. 8. The assembled aircraft fuselage 92 can then be moved by the fuselage transport mechanisms 16, 18 to a painting hanger as represented in FIGS. 9A and 10. As represented in FIGS. 9A and 10, the fork tines 78 of the fuselage transport mechanisms 16, 18 space the jack towers 76 of the fuselage transport mechanisms 16, 18 horizontally away from the assembled aircraft fuselage 92 a sufficient distance to enable paint spraying heads 94 of an automated painting apparatus 96 in a paint hanger to have access to all of the exterior surface of the skin of the assembled aircraft fuselage 92 for application of paint or other surface preparations.

As represented in FIGS. 9A and 10, the automated painting apparatus 96 is comprised of a plurality of paint towers 98. There are six paint towers 98 represented in FIGS. 9A and 10. The automated painting apparatus 96 could comprise more than the six paint towers 98 represented, or fewer than the six towers represented. Each of the paint towers 98 is automated and controlled by CNC to move along tracks 102. The tracks 102 are parallel and extend along opposite sides of the aircraft fuselage 92 attached to the jig 12 and supported by the jack towers 76 in the automated painting apparatus 96. The paint towers 98 are automated guided vehicles and are controlled to move back and forth along the tracks 102 and move completely along the length of the assembled aircraft fuselage 92. Each of the paint towers 98 is comprised of a lower section 104 and an upper section 106. The lower sections 104 and upper sections 106 of the paint towers 98 move vertically relative to each other. This enables the upper sections 106 of the paint towers 98 to be moved vertically relative to the assembled aircraft fuselage 92 to positions below the assembled aircraft fuselage 92 and positions above the assembled aircraft fuselage 92.

Each of the paint towers 98 also comprises a paint tower arm 108 attached to the upper section 106 of the paint tower 98. The paint tower arms 108 are operable to move horizontally back and forth relative to the upper sections 106 of the paint towers 98. This enables the paint tower arms 108 to be moved toward the assembled aircraft fuselage 92 in the automated painting apparatus 96 and away from the assembled aircraft fuselage 92. The paint tower arms 108 could also be attached to the upper sections 106 of the paint towers 98 to pivot about horizontal axes relative to the upper sections 106 of the paint towers 98.

Each of the paint towers 98 also includes a robot spraying head 94 connected to the distal end of the paint spraying arm 108 of the paint tower 98. In this disclosure the spraying heads 94 are described as paint spraying heads 94. However, the spraying heads 94 could be used to apply or spray any type of coating or substance on the aircraft fuselage 92. The paint spraying heads 94 are connected to their respective paint tower arms 108 for pivoting movement in opposite vertical directions, upward and downward relative to the paint tower arms 108, and pivoting movement in opposite horizontal directions, from side to side relative to the paint tower arms 108. The paint spraying heads 94 are operable to spray paint from the paint spraying heads 94 controlled by the CNC of the automated painting apparatus 96.

By movement of the paint towers 98 along the tracks 102, by relative movement of the paint tower lower sections 104 and the paint tower upper sections 106, by movement of the paint tower arms 108 and by movement of the paint spraying heads 94 and the dispensing of paint from the paint spraying heads 94 controlled by the CNC of the automated painting apparatus 96, the assembled aircraft fuselage 92 removably attached to the jig 12 and supported on the fuselage transport mechanisms 16, 18 can be completely covered with paint, or other similar types of surface preparations. With the assembled aircraft fuselage 92 supported by the jig 12, there is no exterior surface of the assembled aircraft fuselage 92 which is obstructed by the automated painting apparatus 96. This enables the entire exterior surface of the assembled aircraft fuselage 92 to receive paint or other surface preparation.

Figure 9B:
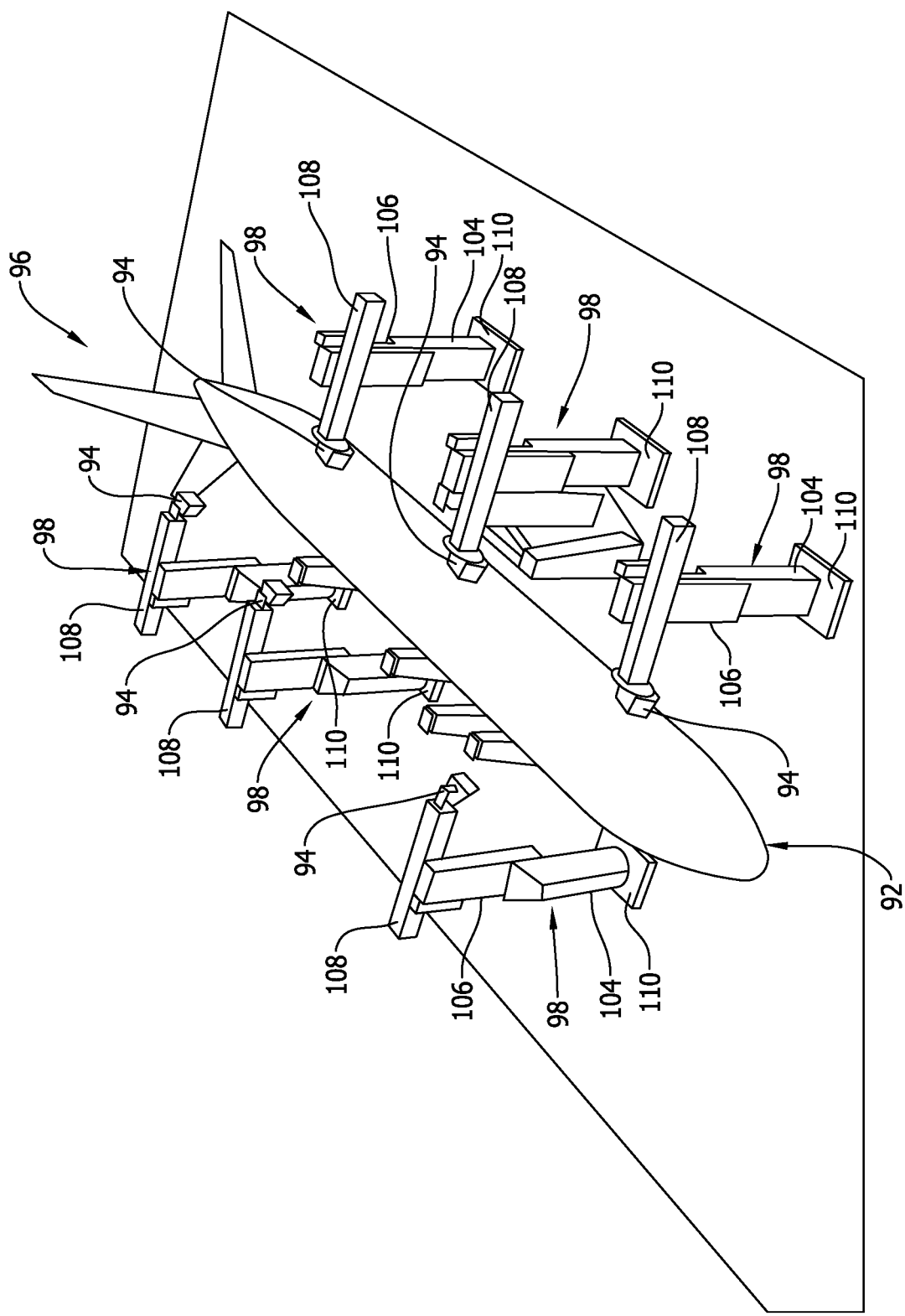
FIG. 9B is a representation of a variation of the paint hanger of FIG. 9A.

FIG. 9B is a representation of the automated painting apparatus 96 of FIG. 9A, except that the automated painting apparatus 96 of FIG. 9B does not include the tracks 102. Instead, each of the paint towers 98 is mounted on an automated guide vehicle (AGV) 110. The AGVs are controlled by CNC to move back and forth along the opposite sides of the assembled aircraft fuselage 92 and completely along the length of the assembled aircraft fuselage 92. The AGVs 110 are not limited to movements along the tracks 102 of the FIG. 9A representation of the automated painting apparatus 96. Apart from this, the automated painting apparatus 96 of FIG. 9B operates in the same manner as the automated painting apparatus 96 of FIG. 9A.

Figure 13:
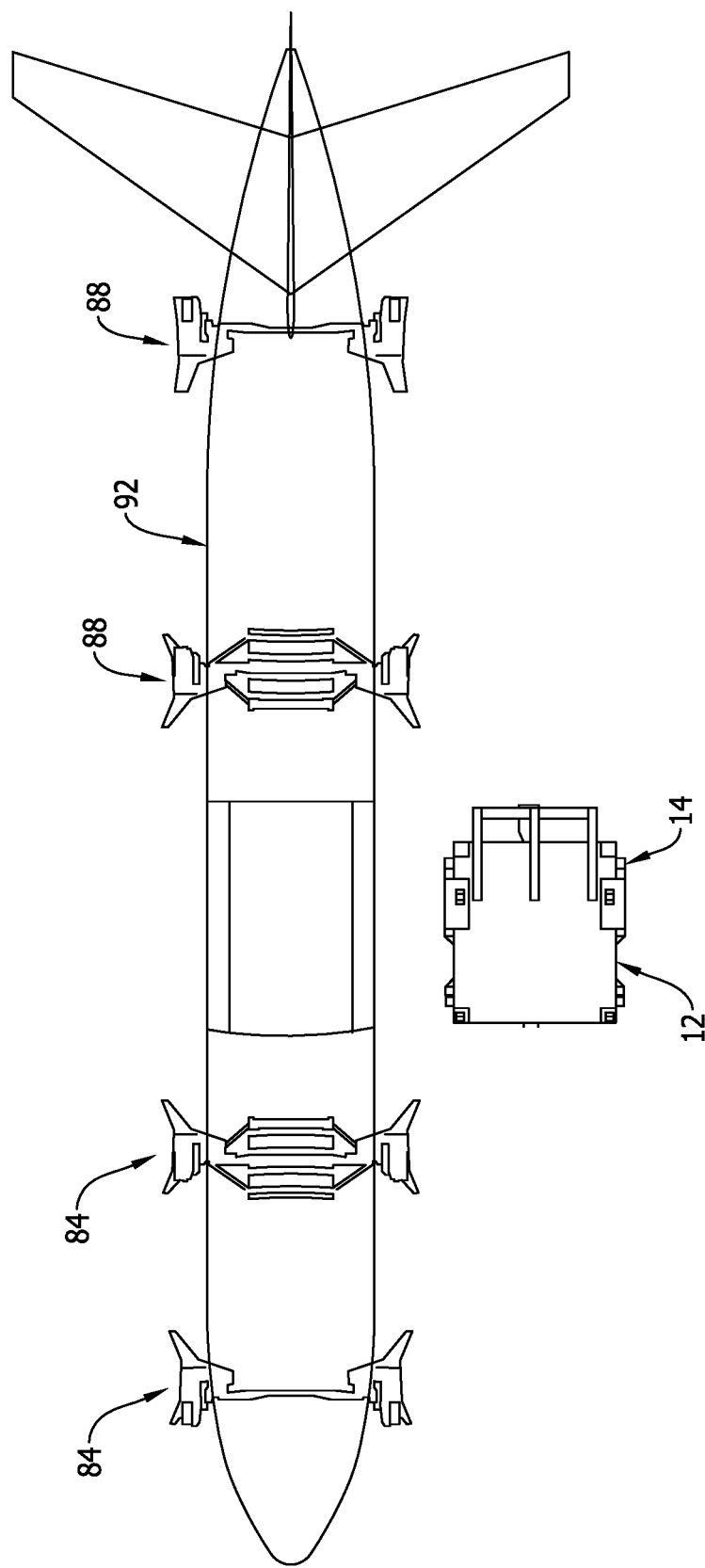
FIG. 13 is a representation of the jig transport mechanism moving the jig from beneath the aircraft fuselage providing access under the center section of the aircraft fuselage for attachment of a wing and landing gear beneath the wing to the aircraft fuselage.
Figure 14:
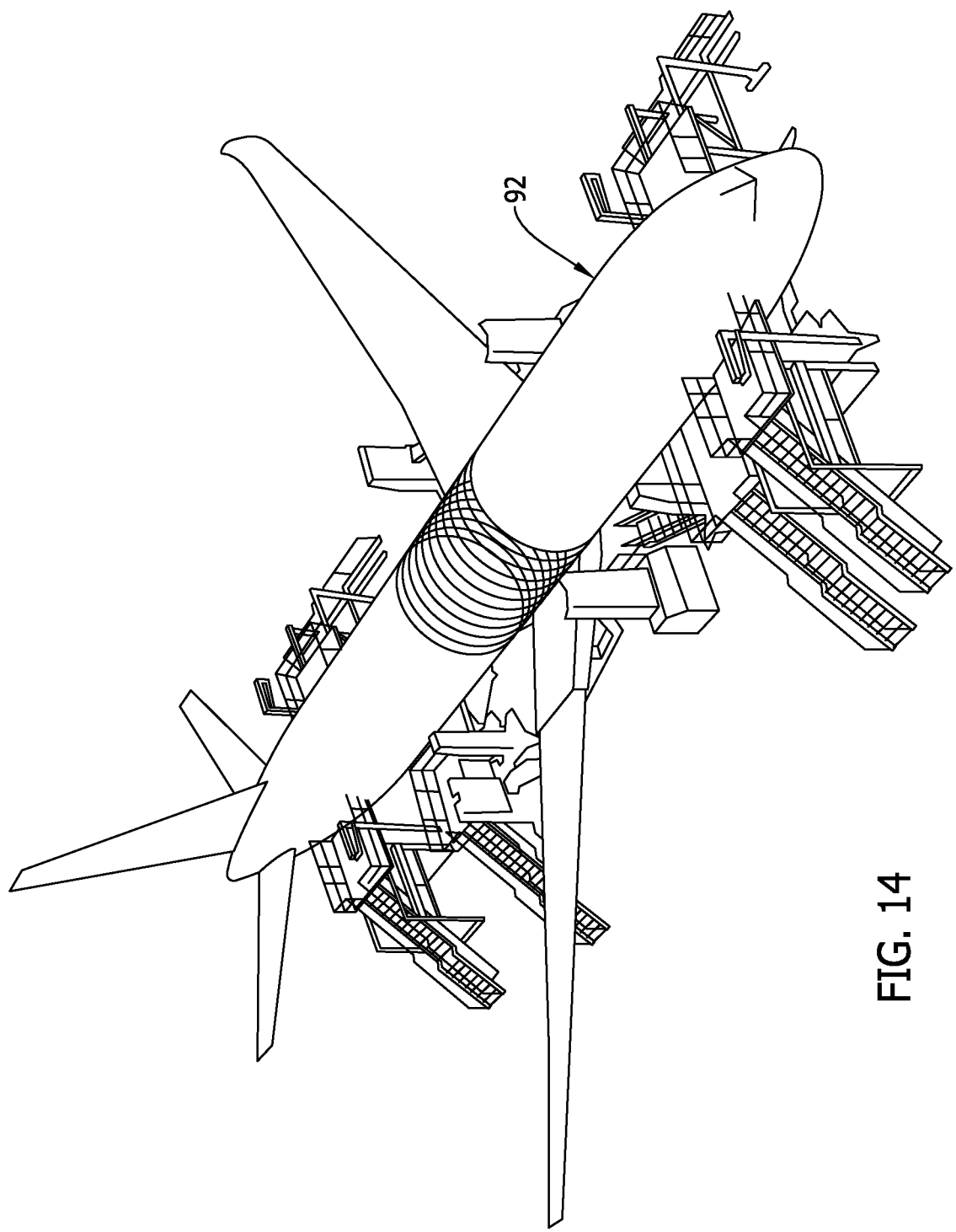
FIG. 14 is a representation of the attachment of a wing and landing gear beneath the aircraft fuselage of FIG. 13.
Figure 15:
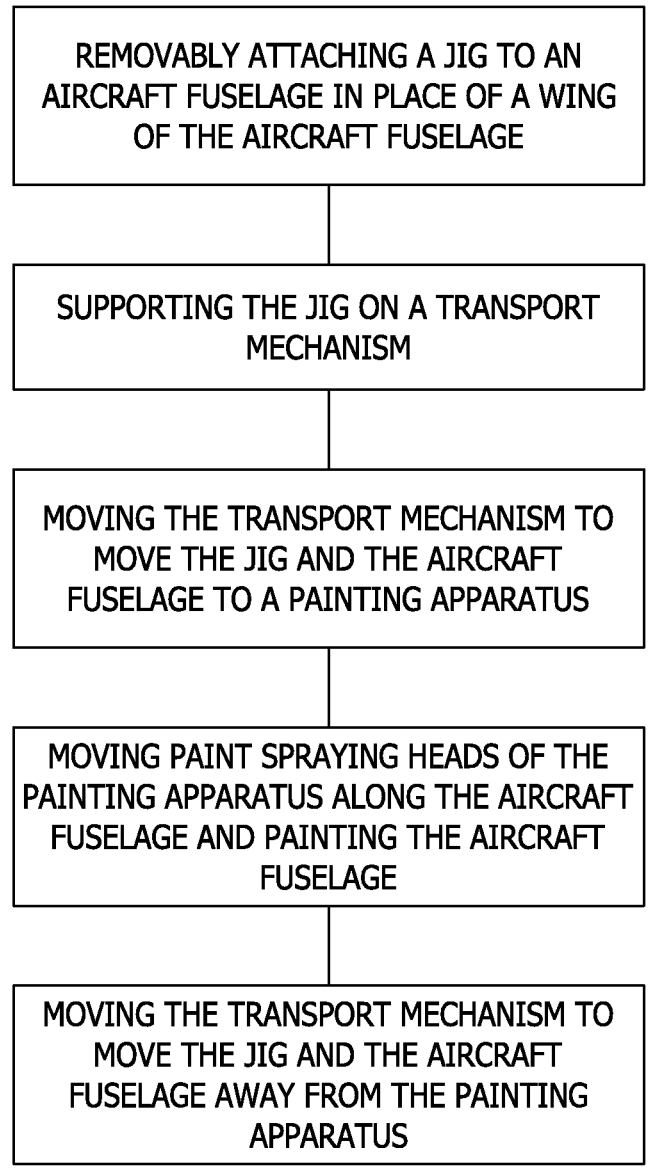
FIG. 15 is a flow chart representing a method of painting an aircraft fuselage employing the apparatus of this disclosure.

When the painting of the fuselage 92 is complete, the fuselage transport mechanisms 16, 18 can then move the fuselage 92 from the painting apparatus 96 to an assembly area where the jig transport mechanism 14 can again be positioned under the jig 12 attached to the fuselage 92. The fuselage transport mechanisms 16, 18 can then lower the fuselage 92 and the jig 12 back onto the jig transport mechanism 14. At the same time, the fuselage transport mechanisms 16, 18 lower the fuselage 92 onto the rigid body motion systems 84, 88 that have been raised to support the fuselage 92. With the fuselage 92 supported on the rigid body motion systems 84, 88, the fuselage transport mechanisms 16, 18 can then be removed from the jig 12. With the fuselage transport mechanisms 16, 18 removed from the jig 12, the jig 12 can then be disassembled from the fuselage 92. The rigid body motion systems 84, 88 can then be operated to raise the fuselage 92 above the jig 12 supported on the jig transport mechanism 14. The jig transport mechanism 14 can then be operated to move the jig 12 out from beneath the fuselage 86. This is represented in FIG. 13. With the jig 12 removed from the fuselage 92 and the wing attachment structures 44, the wings of the aircraft can then be attached to the fuselage 92. This is represented in FIG. 14.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

What is claimed:

1. An airframe handling apparatus comprising:
a jig, the jig having means for removably attaching the jig to an aircraft fuselage in place of a wing of an aircraft; and,
a transport mechanism, the transport mechanism having means for supporting the jig on the transport mechanism, the transport mechanism having means for moving the jig.

2. The apparatus of claim 1, further comprising:
locators on the jig, the locators being positioned on the jig to coincide with wing attachment structures on an aircraft fuselage that are constructed to attach a wing of an aircraft to the aircraft fuselage.

3. The apparatus of claim 1, further comprising:
locators on the jig, the locators being positioned on the jig to coincide with wing attachment structures in an opening in an underside of an aircraft fuselage provided for a wing box of an aircraft wing.

4. The apparatus of claim 1, further comprising:
the transport mechanism being one of a pair of fuselage transport mechanisms, the pair of fuselage transport mechanisms being configured to removably attach to the jig on opposite sides of the jig, the fuselage transport mechanisms being operable to move the jig horizontally in multiple directions and to selectively raise and lower the jig vertically.

5. The apparatus of claim 4, further comprising:
when the jig is removably attached to an aircraft fuselage, and when the pair of fuselage transport mechanisms are removably attached to the jig, the pair of fuselage transport mechanisms do not obstruct access to an exterior surface of the aircraft fuselage.

6. The apparatus of claim 4, further comprising:
a jig transport mechanism that is configured to support the jig on the jig transport mechanism, the jig transport mechanism being operable to move and transport the jig; and,
the pair of fuselage transport mechanisms being separate from the jig transport mechanism.

7. The apparatus of claim 1, wherein:
the jig having a reinforcing framework with structural rigidity and a configuration that is operable to support a load of an assembled aircraft fuselage through wing attachment structures on the aircraft fuselage.

8. An airframe handling apparatus comprising:
a jig, the jig having means for removably attaching the jig to an underside of an aircraft fuselage at wing attachment structures on the underside of the aircraft fuselage; and,
a transport mechanism, the transport mechanism having means for supporting the jig positioned on the transport mechanism, the transport mechanism being operable to move the jig supported on the transport mechanism.

9. The apparatus of claim 8, further comprising:
locators on the jig, the locators being relatively positioned on the jig where securing a portion of an aircraft fuselage to each locator accurately positions the aircraft fuselage relative to the jig.

10. The apparatus of claim 9, further comprising:
each locator being configured to be secured to a bottom end of a rib of an aircraft fuselage.

11. The apparatus of claim 9, further comprising:
the locators being relatively positioned on the jig in a configuration where positions of the locators correspond with positions of the wing attachment structures on the underside of the aircraft fuselage.

12. The apparatus of claim 9, further comprising:
the locators being relatively positioned on the jig in a configuration where positions of the locators correspond with positions of wing attachment structures in an opening in the underside of the aircraft fuselage provided by a wing box of an aircraft wing.

13. The apparatus of claim 8, further comprising:
the jig having locators on the jig, the locators being removably attachable to an underside of an aircraft fuselage in place of a wing of an aircraft.

14. The apparatus of claim 8, further comprising:
the transport mechanism being one of a pair of fuselage transport mechanisms, the pair of fuselage transport mechanisms being configured to removably attach to the jig and support the jig with an aircraft fuselage attached to the jig, the pair of fuselage transport mechanisms being operable to move the jig horizontally with an aircraft fuselage attached to the jig, and the pair of fuselage transport mechanisms being operable to move the jig vertically with an aircraft fuselage attached to the jig.

15. The apparatus of claim 14, further comprising:
the pair of fuselage transport mechanisms being oriented vertically over opposite sides of the jig when the pair of fuselage transport mechanisms are removably attached to the jig; and,
the pair of fuselage transport mechanisms extending vertically over opposite sides of an aircraft fuselage removably attached to the jig with the pair of fuselage transport mechanisms being spaced horizontally from opposite sides of the aircraft fuselage removably attached to the jig.

16. The apparatus of claim 14, further comprising:

a jig transport mechanism, the jig transport mechanism being configured to support the jig positioned on the jig transport mechanism, the jig transport mechanism being operable to move the jig supported on the jig transport mechanism; and, the jig transport mechanism being separate from the pair of fuselage transport mechanisms.

17. An airframe handling apparatus comprising:

a jig having a configuration that is attachable to an aircraft fuselage at wing attachment structures of the aircraft fuselage; and, a transport mechanism having a configuration that removably supports the jig on top of the transport mechanism, the transport mechanism having drive wheel assemblies that are controllable to move the transport mechanism and move the jig supported on top of the transport mechanism.

18. The apparatus of claim 17, further comprising:

locators on the jig, the locators being positioned on the jig in a configuration that provides the jig with the configuration that is removably attachable to an aircraft fuselage at wing attachment structures on the aircraft fuselage.

19. The apparatus of claim 17, further comprising:

locators on the jig, the locators on the jig providing the jig with a configuration where the locators are attachable to wing attachment structures in an opening in an underside of the aircraft fuselage provided for a wing box of an aircraft wing.

20. The apparatus of claim 17, further comprising:

the transport mechanism being one of a pair of fuselage transport mechanisms, each fuselage transport mechanism having a configuration that is removably attachable to the jig on opposite sides of the jig, each fuselage transport mechanism being operable to selectively move the jig supported on the fuselage transport mechanism vertically upwardly and downwardly.

* * * * *